United States Patent

Schneider et al.

[15] 3,678,275

[45] July 18, 1972

[54] DOSIMETRY SYSTEM FOR MEASURING INSTANTANEOUS DOSE AND LINEAR ENERGY TRANSFER SPECTRUM OF SPACE RADIATIONS

[72] Inventors: Marion F. Schneider; Edward L. Breen, both of Alburquerque, N. Mex.

[73] Assignee: The United States of America as represented by the Secretary of the Air Force

[22] Filed: April 15, 1971

[21] Appl. No.: 134,280

[52] U.S. Cl. .................................. 250/83.6 R, 250/83.3 R
[51] Int. Cl. .......................................... G01t 1/02, G01t 1/18
[58] Field of Search ............................... 250/83.3 R, 83.6 R

[56] References Cited

UNITED STATES PATENTS

| | | | |
|---|---|---|---|
| 2,596,080 | 5/1952 | Raper et al. | 250/83.6 R X |
| 3,019,339 | 1/1962 | Wesley | 250/83.6 R |
| 3,185,844 | 5/1965 | Bess | 250/83.6 R X |
| 3,614,444 | 10/1971 | Nirschl | 250/83.6 R |

*Primary Examiner*—Archie R. Borchelt
*Attorney*—Harry A. Herbert, Jr. and Henry S. Miller, Jr.

[57] ABSTRACT

A space radiation dosimetry system utilizing a portable ionization chamber mountable in a housing containing associated electronics and a linear energy transfer (LET) spectrometer with associated electronics. The LET spectrometer utilizes a pair of solid state detectors in combination with amplifiers, a discretionary number of discriminator channels, logic circuits and counters to measure the linear energy transfer spectrum of high energy ionizing radiations.

2 Claims, 17 Drawing Figures

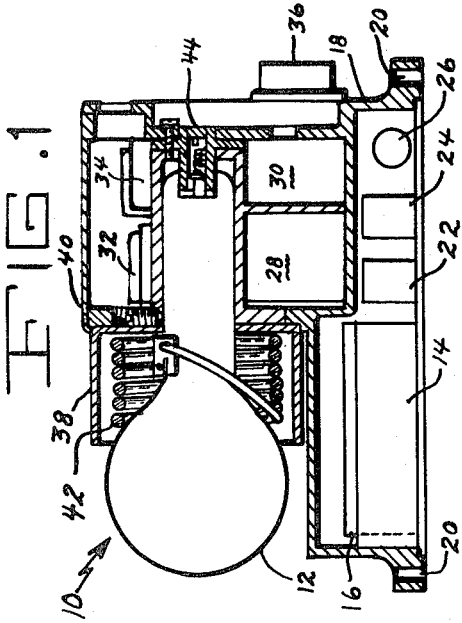
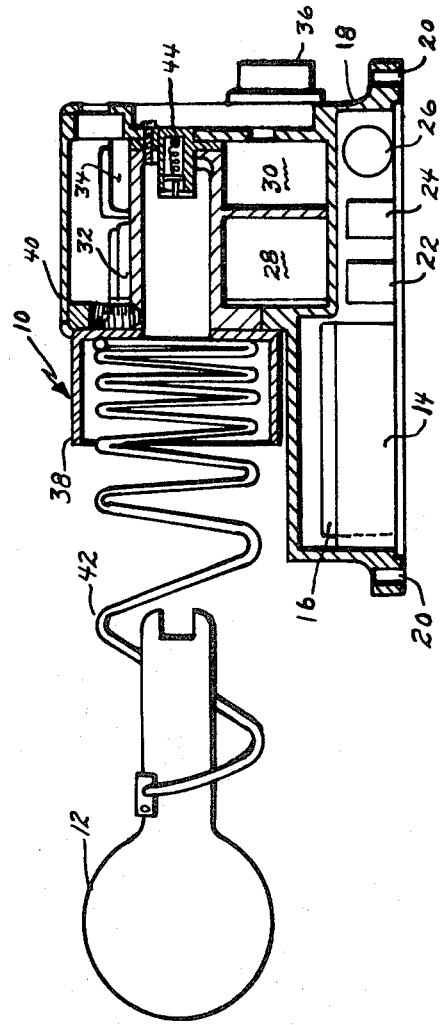
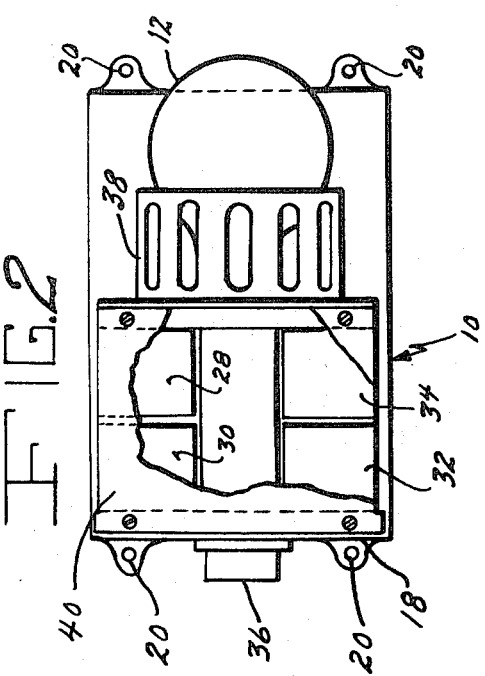

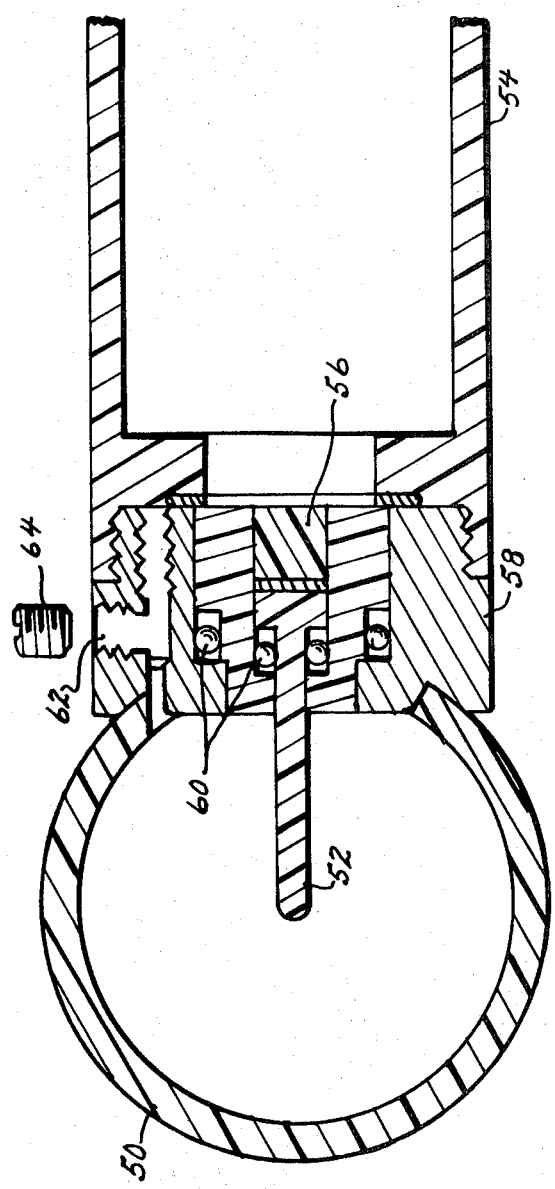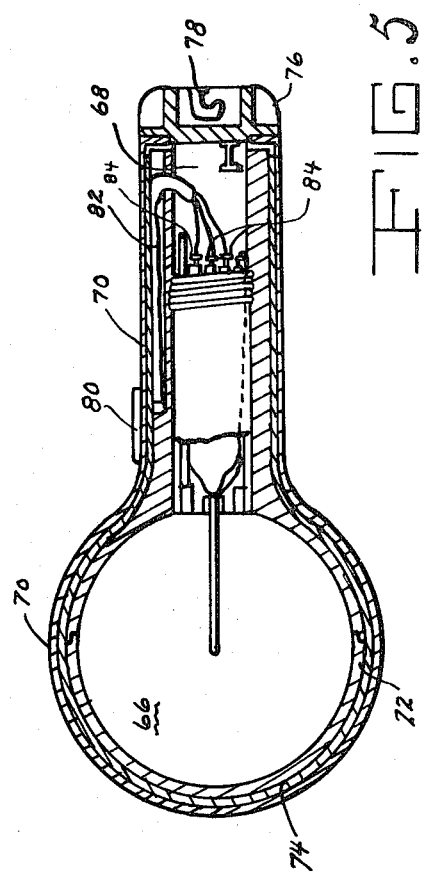

INVENTORS
MARION F. SCHNEIDER
EDWARD L. BREEN
BY Harry A. Herbert Jr.
Henry S. Miller Jr.
ATTORNEYS

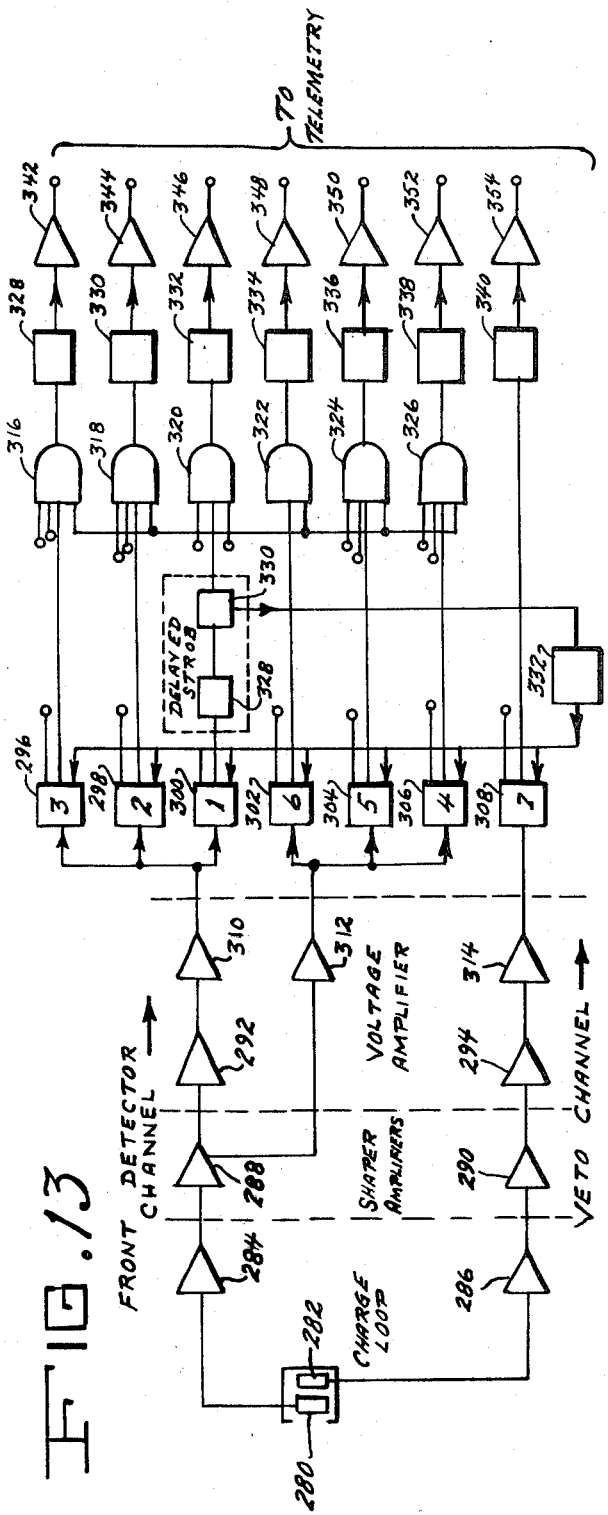
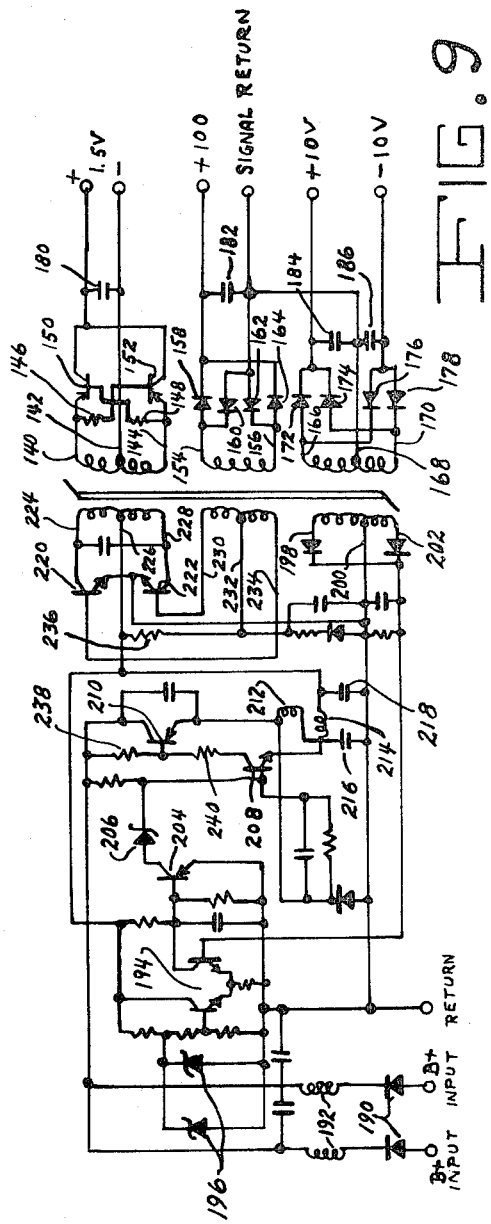

INVENTORS
MARION F. SCHNEIDER
EDWARD L. BREEN
BY Harry A. Herbert Jr.
and
Henry S. Miller Jr.
ATTORNEYS

DOSIMETRY SYSTEM FOR MEASURING INSTANTANEOUS DOSE AND LINEAR ENERGY TRANSFER SPECTRUM OF SPACE RADIATIONS

BACKGROUND OF THE INVENTION

This invention relates generally to field of radiation dosimetry, and more specifically to an active dosimetry system that will measure the instantaneous dose and linear energy spectrum of space radiations.

Instrumentation to measure the radiobiologically significant high energy radiations encountered in manned spaceflight is of fundamental importance in ensuring astronaut safety and ultimate mission success. Thus far, manned space operations have not encountered dangerous radiation levels, either because of the absence of high energy solar particles, the avoidance of the areas of highest fluxes of trapped particles in the earth's magnetosphere, or the relatively short duration of the missions. On future long-term missions the avoidance of such encounters may not be possible, and a very comprehensive measurement of radiation levels received must be realized. This invention will describe an advanced active dosimetry system that will measure and record the radiobiologically important radiations encountered in manned spaceflight.

The most important radiations to be monitored in extended long-term missions are solar flare and Van Allen Belt protons with energies greater than 30 Mev. These particles exist in a complex and often unpredictable array of fluxes and spectra. For manned operations, the energy spectra and depositions of these particles must be measured at specific locations of astronaut operations.

The physical effects of these high energy corpuscular radiations can range from insignificant cellular damage to loss of life for biological systems under their influence, depending on the magnitude and type of exposure. The degree of radiation effectiveness in impairing the functions of biological systems is determined principally by the locally absorbed radiation dosage and the locally delevered linear energy transfer spectrum of the absorbed radiations.

The absorbed dose is the quotient of $dE$ by $dm$. $dE$ is the energy imparted by ionizing radiation to matter in a volume element $dM$ and $dM$ must be so small that a further reduction in its size would not appreciably change the measured value of the quotient of energy by mass and large enough that it contains many interactions and is traversed by many particles. The unit of absorbed dose is the rad, defined to be 100 ergs of absorbed energy per gram or 0.01 j/Kg. The linear energy transfer (LET) of charged particles in a medium is the quotient of $dE$ by $dl$, where dE is the average energy locally imparted to the medium by a charged particle of specified energy in traversing a distance of $dl$. LET is defined as the linear energy transfer with all of the delta ray (energetic secondary electrons) considered. The quantity (LET) is very closely approximated by the stopping power for high energy charged particles.

The dosimetry system disclosed in this invention utilizes an ionization chamber operated on the Bragg-Gray principle. This principle relates the ionization of a gas in a cavity contained in a medium to the absorbed dose in that medium.

The system further includes a linear energy transfer spectrometer sensor. The linear energy transfer (LET) spectra of space radiations are in general extremely complicated and difficult to measure. Devices developed to measure LET spectrum employing low pressure proportional counters and similar types of space hardened gaseous proportional counters have been designed for use on satellite flights and high altitude aircraft flights to measure the anticipated LET spectra encountered in spaceflight. Instruments of this type have had only limited use in spaceflight. Limitations were due to problems involved with maintaining stable gas pressures and compositions in the low pressure environment of space for extended periods and the lack of resolution of such devices to wide energy wide ranges. The numerous difficulties encountered by attempts to use proportional counters in space to measure the LET spectrum are avoided in the instant invention by the use of solid state semiconductor detectors.

SUMMARY OF THE INVENTION

The active dosimeter described in this invention involves the use of ionization chambers that operate on the aforementioned Bragg-Gray principle relating to the ionization of a gas in a cavity contained in a medium to the absorbed dose in that medium. Ionization current in a gas cavity contained in a medium is related to the absorbed dose rate in the medium by the following linear equation:

$$E_m = S_m \, W J_{gas}$$

where
$E_m$ = energy absorption in the medium in electron volts/gram sec
$S_m$ = mass stopping power of the wall material relative to the gas
$W$ = average energy in ev required to form an ion pair in the gas
$J_{gas}$ = ionization current in ion pairs/gram sec
measurements are processed automatically by signal-conditioning electronic systems for recording.

Since the biological damage resulting from ionizing radiation, in general, occurs in human tissue, the all material of the ionization chamber that forms the medium in which the dose is measured must be tissue equivalent. The tissue usually chosen for this purpose is muscle tissue. The dose rate of energy deposition is determined by the cross sections of each of the many chemical constituents making up tissue to the total radiation field encountered by that material. The cross sections are dependent on the energy and type of radiation striking the tissue material. Therefore the material of the ionization chamber walls must be as closely matched in atomic composition to the atomic composition of human muscle tissue as possible for the chamber to be tissue equivalent. That is, the material making up the walls should have cross sections and stopping powers for all possible encounterable radiation that are very closely matched to standard muscle tissue. These plastics when used as a sensor wall material allows for more accurate measurement of the tissue dose than could be realized by the use of metals such as aluminum or stainless steel which are often used as ionization chamber wall materials and provide, at best, extrapolations to the true tissue dose in mixed field dosimetry.

In addition to a tissue equivalent chamber, the underlying theory of the invention requires, that to have an ionization chamber cavity of reasonably large volume capable of measuring the dose in a tissue equivalent medium, the gas should be matched automatically to this medium. The invention utilizes a nonexplosive tissue equivalent gas consisting of methane, carbon dioxide, and nitrogen.

Since a tissue equivalent gas and wall material are both used in these sensors, they are designed to make measurements of energy independent tissue absorbed dose from the main component of space radiation, high-energy protons, as well as dose from any other lesser components of the radiation field, such as electrons, bremsstrahlung x-rays, and other recoil particles.

The electronic circuitry utilized with the tissue equivalent ionization chamber has not been significantly varied from those circuits currently in existence.

This invention includes, with the tissue equivalent ionization chamber, a system for measuring the linear energy transfer to provide information concerning radiation that affects critical centers in the body such as the formation of cataracts in the eyes, gastrointenstinal, skin, bone marrow damage, and others. For a heterogeneous mixture of corpuscular radiation such as exist in the earth's radiation belts, a wide spectrum of LET values may exist at various depths. The LET spectra must be measured and combined with the radiation doses and depth doses to give the effective dose factors.

The invention provides a solid state LET spectrometer that is capable of operating effectively while located in the same package with a tissue equivalent dosimeter. The ability to assemble a dosimeter that will provide these two important measurements in a single compact unit is especially important in the manned space programs where weight and space are critical.

The LET system is a low energy proton and alpha particle spectrometer which samples radiation entering its vicinity in energy intervals that provide a measure of the LET spectrum. It employs two semiconductor type detectors operated in a radiation telescope, utilizing a front or entrance detector where the energy analysis of particles takes place. The second detector is an anticoincident detector for measurements made in the first detector and as a total counts device for particles passing through it. The anticoincident detector eliminates particles that pass through the first detector from being confused with particles that stop in the same detector.

While the main embodiment of the invention considers a two-detector, solid state telescope for measuring the LET of protons, alpha particles and heavy nuclei, the degree of sophistication employed in measuring the LET spectrum can have a very wide range based on the sensors and electronics utilized. If a very precise definition of the LET spectrum is sought, for example, over a large energy range and for a wide variety of radiations, the invention would call for increasing the number of detectors and correspondingly increase the capability of the electronic pulse height analyzing equipment.

It is therefore an object of the invention to provide a new and improved active dosimetry system.

It is a further object of the invention to provide an active dosimeter system that combines apparatus for measuring instantaneous dose and the linear energy transfer spectrum of space radiations in a single enclosure.

It is another object of the invention to provide an active dosimeter that will provide accurate information of the dose and particle spectrum inside a spacecraft.

It is still a further object of the invention to provide an active dosimetry system that will simultaneously measure absorbed dose and linear energy transfer spectra.

It is still another object of the invention to provide a linear energy transfer spectrometer that eliminates the undesirable properties of gas diffusion, gas contamination, and unstable pressures found in prior art devices.

It is another object of the invention to provide a new and improved energy spectrometer that utilizes solid state sensors.

It is another object of the invention to provide a new and unique electronic circuit for a solid state linear energy spectrometer.

It is another object of the invention to provide a new and improved dosimeter system that is small in weight and size.

It is another object of the invention to provide a new and improved dosimeter system that is strong and will stand more abuse than those known in the art.

It is another object of the invention to provide a new and improved dosimeter system that will have portable sensor elements.

It is another object of the invention to provide a space radiation dosimetry system that has a wide radiation response range and long-term accuracy.

It is still another object of the invention to provide a system that is able to measure tissue equivalent dose levels from mixed radiation fields over a wide range of energies.

These and other advantages, features and objects of the invention will become more apparent from the following description taken in connection with the illustrative embodiment in the accompanying drawings.

DESCRIPTION OF THE DRAWINGS

FIG. 1 is a side elevational view of the invention partly in section.

FIG. 2 is a top view of the invention partially cut away.

FIG. 3 is a side elevational view partly in section showing the invention in an alternative configuration;

FIG. 4 is a cross sectional view of a tissue equivalent ionization chamber sphere and barrel assembly;

FIG. 5 is a cross sectional view of a tissue equivalent ionization sensor;

FIG. 9 is a circuit diagram of the power supply used with the tissue equivalent ionization chamber;

FIG. 13 is a block diagram of the LET detection system;

DETAILED DESCRIPTION OF THE PREFERRED EMBODIMENT

Figure 8:
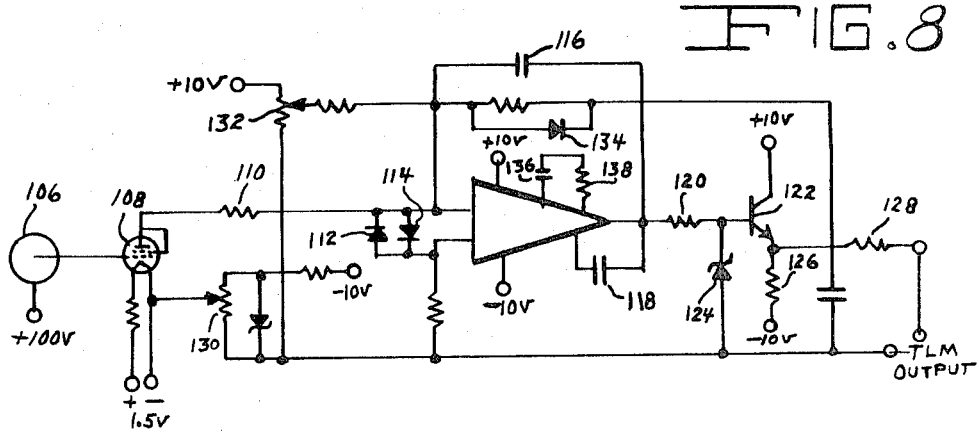
FIG. 8 is a circuit diagram of the tissue equivalent ionization chamber sensor, preamplifier and amplifier.

The active dosimeter mechanical envelope is shown generally at 10 in FIGS. 1, 2 and 3. The mechanical package is designed to house the tissue equivalent ionization chamber 12 along with linear energy transfer spectrometer electronic modes 14 and 16.

The entire package is mounted on a base 18 with holes 20 adapted to accept bolts for mounting the unit. Within the base are mounted a pair of calibration modules 22 and 24 along with a fuse module 26. In a compartment above the base are mounted the LET power supply and LET signal analyzer modules 28 and 30. Also mounted in this compartment are the power supply 32 and amplifier 34 for the tissue equivalent ionization chamber (TEIC). The electrical requirements of the unit are handled through the connector 36.

The TEIC sensor is shielded to prevent breakage by the guard 38 which is formed from an extension of the upper compartment housing 40. Within the guard is a detractable current carrying spring cable 42 connecting the TEIC radiation sensor to the dosimeter housing thereby making the sensor portable. When not in survey use, the portable sensor is locked into the parent active dosimeter package. Locking and unlocking the sensor to and from survey use is accomplished by a quarter turn of the locking mechanism 44.

FIGS. 4 and 5 show the details of the tissue equivalent ionization chamber. One embodiment consists of a sphere 50 of tissue equivalent plastic. This is an electrode and acts as the high voltage electrode for the ionization chamber system. The other ionization collecting electrode is a thin cylindrical probe 52 centered within the spherical outer electrode. The probe is connected to the electronics barrel 54 through a connector 56 that passes through a coupler 58, contains O-ring seals 60 and is equipped with a gas port 62 through which the sphere is filled with tissue equivalent gas. The port is sealed with the plug 64. In the embodiment shown in FIG. 5, the sphere 66 and electronics barrel 68 are encased in a stainless steel protective shield 70. The shield acts as a hermetic seal and further protects the tissue equivalent ionization chamber from shock.

The inner layer 72 of the three-walled chamber consists of the tissue equivalent plastic discussed with regard to FIG. 4. Between the layers 70 and 72 is an insulative layer 74 of epoxy resin which electrically separates the inner and outer layers of the structure.

The electronics barrel ends in a tube cap 76 which contains a hook 78 that mates with the locking mechanism on the dosimeter package. Cable clamp 80 is secured to the outer housing by a screw and holds the cable subassembly 82 against the spring tension applied by the cable as explained with regard to FIG. 3. The cable subassembly is attached to the chamber electrodes through the terminals 84.

Figure 6:
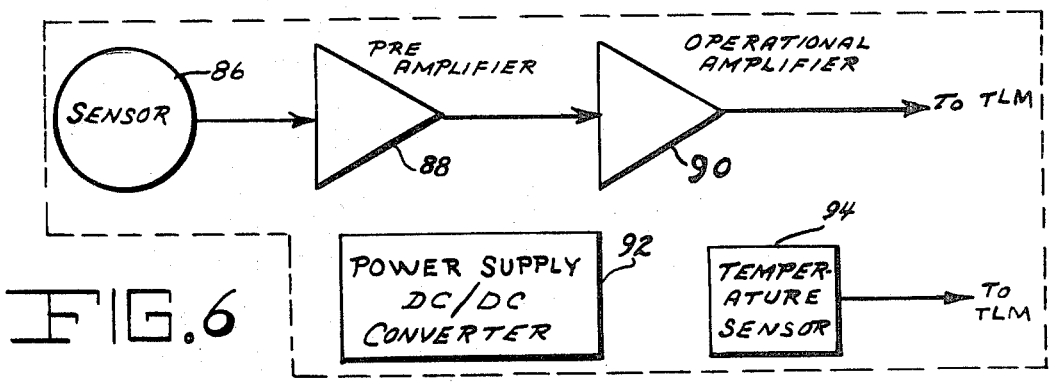
FIG. 6 is a schematic diagram of a tissue equivalent ionization chamber sensor and preamplifier.

A block diagram of the tissue equivalent ionization chamber electronics is given in FIG. 6. The sensor 86 puts out a signal to the preamplifier 88 where it is conditioned and fed to the operational amplifier 90. From the amplifier 90 the signal is sent to a telemetry output for spacecraft application. Included in the system is a power supply 92 and a temperature sensor 94 which provides additional information to the telemetry output.

Figure 7:
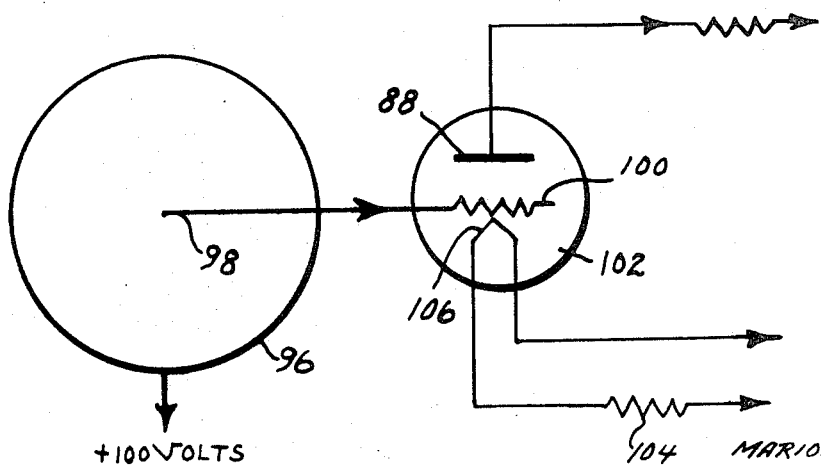
FIG. 7 is a block diagram of the tissue equivalent ionization chamber electronics.

The tissue equivalent ionization chamber (TEIC) and its preamplifier subsystem is shown in FIG. 7. The ionization chamber has an outer high voltage electrode 96 that is maintained at approximately +100 volts; a second electrode 98, referred to as the collecting electrode, is a thin cylindrical probe centered within the spherical outer electrode. The collecting electrode is connected directly to the grid 100 of the electrometer tube 102. The electrometer acts as a preamplifier and is used to collect and amplify the instantaneous ionization current formed in the tissue equivalent cavity when operated in the triode-connected floating grid mode. The floating grid mode is so called because of the grid's operating without a grid resistor at approximately zero volts with respect to the cathode.

A protective resistor 104 is placed in the cathode 106 circuit to insure a constant current to the cathode filament. The current from the plate 108 is used as the input signal for the final signal conditioning amplifier that connects with a final output system. In the event the invention is utilized in a spacecraft application, the final signal conditioning amplifier would be operatively connected to the spacecraft telemetry system.

The detailed circuit diagram for the tissue equivalent ionization chamber sensor, preamplifier and amplifier are shown in FIG. 8. The ionization chamber 106 feeds a signal to the grid of the electrometer tube 108 as explained with regard to FIG. 7. The output current from the plate of the electrometer is cathode and ground. Diodes 112 and 114 are employed for additional operational amplifier temperature compensation. Following amplifietion, part of the signal is fed back positively from pin 6 through capacitors 116 and 118 to increase stability and gain of the amplifier. Resistor 120 is the current driver for transistor 122 and also provides the current limit for output diode clamp 124, which is used to limit signals from the operational amplifier to the 0.0 to 5.0 volt range. Components 122 and 126 form the output buffer driver to telemetry. Resistor 128 is used as a current limit for the circuitry and provides protection against shorts to ground. Capacitor 124 is a 2.2 microfarad filter for the amplifier output.

The signal conditioning subsystem is provided with both gain and bias adjustments. These adjustments are used to set the DC level and slope of the input current versus output curves. For example, for operations in very low level radiation environments the gain would be set at its maximum value with a minimum slope setting for the bias to obtain maximum low level radiation response sensitivity. Gain adjustment is obtained by variable resistor 130 between the negative side of the filament and ground of the operational amplifier. The gain adjustment has the effect of raising or lowering the amplification factor of the electrometer. Bias adjustment is accomplished by varying resistor 132 between operational amplifier output and ground. Diode 134 blocks negative signals from entering pin 2 of the operational amplifier through the feedback loop. Components 136 and 138 are employed to provide the proper high frequency compensation for the operational range selected.

The electronic conversation unit (power supply) subsystem shown in FIG. 9 is a DC to DC converter with series input regulation and hard diode protection. The DC to DC converter supplies high voltage for the ionization chamber high voltage electrode, electrometer plate and filament voltages, and the driving voltages for the signal conditional amplifier and temperature sensor. Transformer windings 140, 142 and 144 provide the 1.5 volt filament voltage. Resistors 146 and 148 and transistors 150 and 152 provide the low voltage rectification for the 1.5 volt signal. Transformer windings 154 and 156 supply the 100 volts to the tissue equivalent ionization chamber sensor. The diodes 158, 160, 162 and 164 form the full wave bridge high voltage rectifier for the +100 volt source. Transformer windings 166, 168 and 170 deliver the +10 volts and −10 volts to drive the signal conditioning amplifier and telemetry buffer driver. Additionally, these voltages are used for the bias and gain adjustments in the signal conditioning amplifier. Diodes 172, 174, 176 and 178 form the full-wave rectifier for the ±10 volt outputs. Capacitors 180, 182, 184 and 186 are output filters for the various power supply voltages just discussed.

The power supply system operates from an unregulated input power source in the range of 28 + 4 or −8 volts DC. The input is diode protected by 190 up to 300 volts of reverse polarity voltage. The input is further filtered by 190, 192. Transistor 194 is the differential pair amplifier for the series regulator. Zener diode CR2 provides the reference voltage to 194. Transformer windings 198, 200 and 202 form the voltage error sensing element to detect voltage changes in any of the secondary windings in the transformer. Changes with respect to the center tap 200 in windings 198 and 202 are transmitted through the voltage sense network as an error voltage to 194. This changes the bias on 194 with respect to input return. These changes in 194 in turn are forced on the base of 204 which changes the current through Zener diode 206. This Zener diode then transmits this through transistors 208 and 210. The series regulator signal is transmitted through the 212, 214, 216 and 218 filter system to the switcher transistors 220 and 222 which are connected to transformer windings 224, 226 and 228. The switcheriis driven from transformer windings 230, 232 and 234. The driving resistor for the switches is 236. The resistors 238 and 240 are the voltage dividers for the series regulators 208 and 210. If changes are observed, the switchers via the error sense network will correct the voltage.

Figure 10:
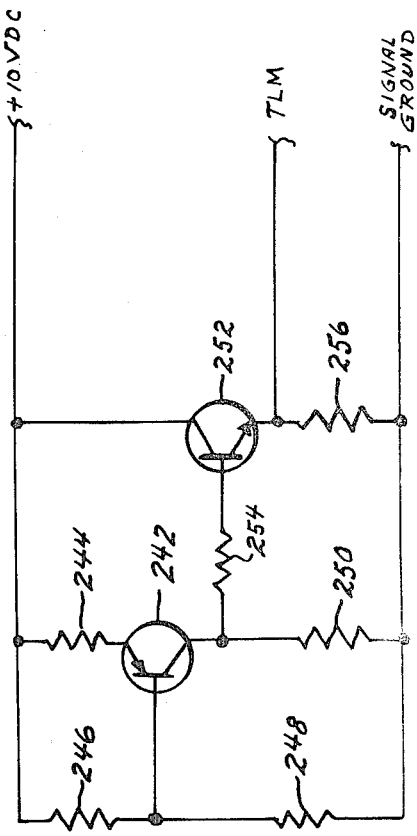
FIG. 10 is a circuit diagram of the temperature sensing unit utilized in the invention.

FIG. 10 details the temperature sensor subsystem. The subsystem consists of a solid state temperature sensing unit and associated circuitry. In the figure, a temperature sensitive transistor 242 is connected through resistors 244, 246, 248 and 250 to provide a wide operating range, e.g., −40° to + 160° F. Transistor 252 and resistors 254 and 256 are output drivers to telemetry. The temperature sensor is powered by a constant +10 volt signal from the power supply.

The invention thus far described has concerned the tissue equivalent ionization chamber (TEIC). The remaining figures refer to the linear energy transfer (LET) spectrometer and its place in the invention.

Figure 11:
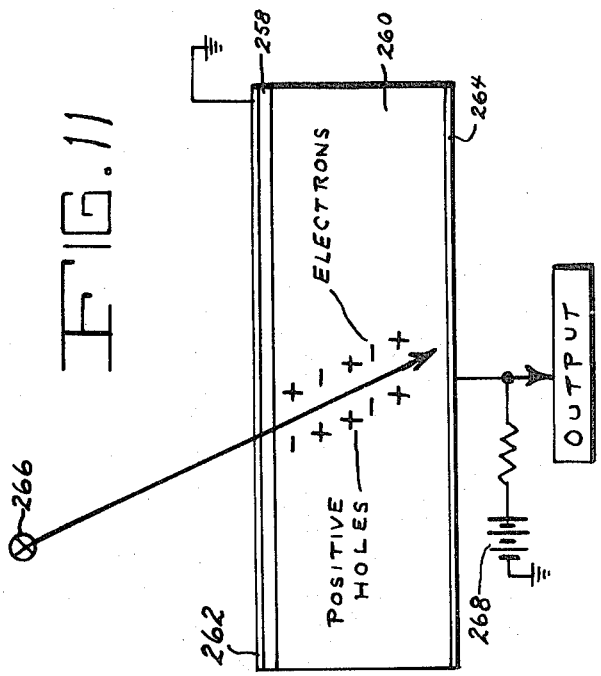
FIG. 11 is a schematic representation of a solid state linear energy transfer detector.

The LET spectrometer employs two semiconductor type detectors operated in a radiation telescope to collimate and control the radiation field. The principle of operation of the detector is presented in FIG. 11. The detector is a large p-n junction diode consisting of a very thin p-type layer of silicon 258 mounted on the most sensitive side of a highly pure n-type silicon chip 260. A gold film 262 of approximately 100A is evaporated onto the p-type layer 258 to provide electrical contact to this side of the diode. The n-type silicon 260 is fixed with an ohmic contact 264 at its back side to form the other electrode detector system.

When a semiconductor is bombarded by a charged particle 266, this incident particle liberates a large number of electrons and positive hole pairs in the active region. Energetic electrons cause other ionizations leading to a cascading process. The number of ion pairs produced is a function only of the energy deposited and not the type of particle that produced it, making this type of detector suitable for use in the mixed field radiation spectroscopy where the invention will be most frequently found. The electrons, produced by the ionization, drift to the positive electrode and the holes move to the negative electrode under the influence of the potential field set up by the bias supply 268. The collection of this charge is either a constant current or pulse mode that allows the particles to be detected. The size of the electrical pulses or current at the electrodes is determined by how many electron-hole pairs are separated and collected by the applied external electric field. From an analysis of the pulse size the energies of the incident particles are determined.

Figure 12:
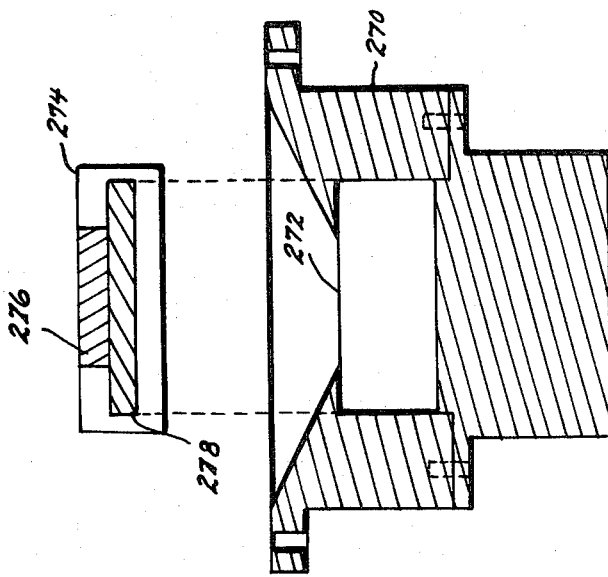
FIG. 12 is a cross sectional view of the solid state linear radiation telescope.

The LET radiation telescope is shown in FIG. 12. The LET detector consists of a solid tungsten housing 270 having an aperture 272 and so constructed that the detector insert 274 is shielded in a manner that will allow protons and alpha particles to enter from only one plane so they may be properly analyzed.

The detector insert 274 is formed of two lithium drifted solid state diode detectors 276, 278, operated as a charged particle telescope. The first or entrance detector 276 is 2.0 millimeters in thickness to provide the desired energy analysis of the high linear energy transfer components of the radiation environment. The second detector 278 is 1.0 millimeter thick. This detector is used as an anticoincidence detector for measurements made in the first detector and as a total counts device for particles passing through it. The anticoincident detector eliminates particles that pass through the first detector from being confused with particles that stop in the same detector. The two detectors are effectively separated by two layers of gold used as contact media and an electrical insulative layer utilized to separate the layers of gold.

With respect to FIG. 13, there is shown a block diagram of the linear energy transfer spectrometer electronics circuit. The charge signals originating in the solid state detectors 280, 282 when radiation strikes the detectors are converted to voltage signals by special charge loop preamplifiers 284 and 286. These amplifiers have a sensitivity of approximately 10 millivolts/Mev of energy loss in the silicon solid state detectors. The long tail voltage pulses from the charge loops are processed by the shaper amplifiers 288 and 290. Each amplifier develops a gain of 10 and has $0.5 \times 10^{-6}$ second equal integration and differentiation. The signal is finally amplified by specially designed voltage amplifiers 292, 294. Following the amplifiers the LET analyzer electronics utilizes seven pulse height analyzers or discriminators 296–308 to perform the electrical function of selecting the shaped and amplified pulses according to their amplitude or height and placing them in seven energy channels. The pulse height analyzers are integrated circuits and categorize electrical pulses into the following energy intervals 0.5 to 2.0, 2.0 to 6.0, 6.0 to 10.0, 10.0 to 14.0, 14.0 to 18.5, and 18.5 to 75 Mev, corresponding to the energy levels that are being measured in the first solid state LET detector 280. A pulse of 0.5 Mev in amplitude, for example, from the buffers 310, 312, 314 triggers only the first of the pulse height analyzers 300. Pulses of 18.5 Mev trigger all of the pulse height analyzers.

The logic circuits 316 to 326 are typical AND gates and are utilized to insure proper processing of the discriminated signal. The delayed strobe circuits 328 provide a pulse action to the discriminator reset 332 whereby the delayed strobe resets the discriminator and logic circuitry of the LET system so that they are in the ready-to-count condition again. The output from the logic circuits is sent to the counters 328–338 while the output from the discriminator 308 is sent to rate meter 340. The signal from the counters and rate meter is thence passed to the appropriate telemetry buffers 342–354 and on to the telemetry system.

Figure 14:
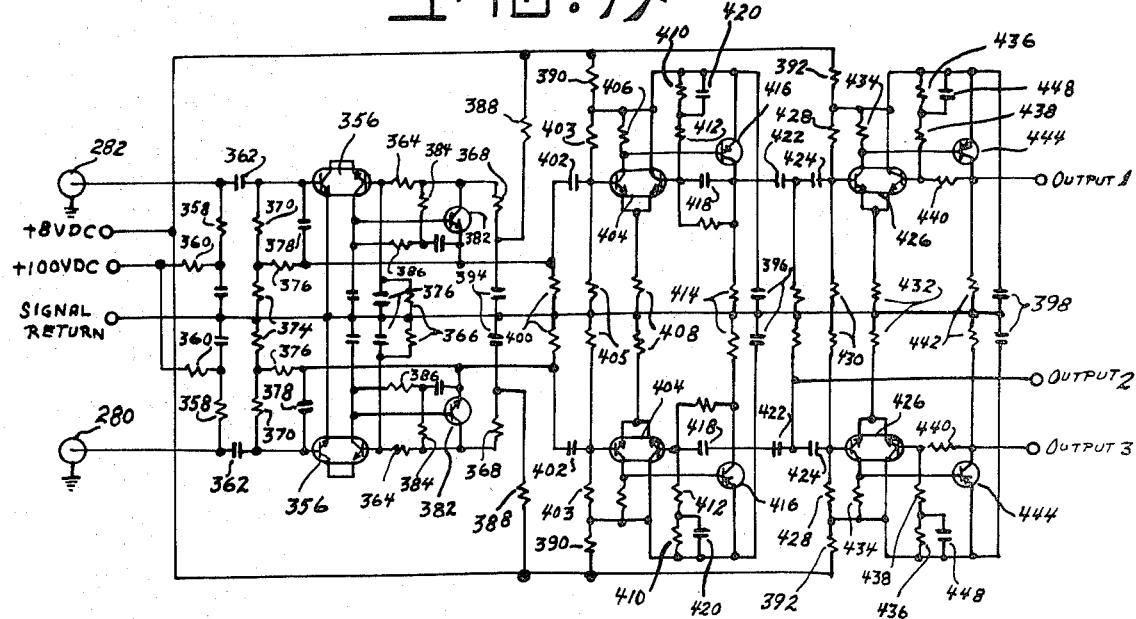
FIG. 14 is a circuit diagram of the LET detector system detectors and preamplifiers.

FIG. 14 is an electrical schematic diagram for the detectors, preamplifiers, shaper amplifiers and voltage amplifiers disclosed in FIG. 13. The subsystems are given for both the first detector 280 and the second detector 282. Due to the identical functions of the first and second detectors only the second detector systems will be discussed in detail.

Dual transistor 356 is the center of the charge loop amplifier network. It amplifies the charge pulses in the solid state detector. Resistors 358 and 360 and capacitor 362 are the high-voltage input network to the solid state detector 282 from the LET power supply. Resistors 358 and 360 are used as voltage dividers in this application. Capacitor 362 is part of the charge sensing network as input to the dual transistor 356. Resistors 364, 366 and 368 are the bias resistors for the second half of the dual transistor 356. Resistors 370, 372 and 374 are part of the feedback network to tranSistor 356. Capacitor 376 is also part of this feedback loop and is included to prevent oscillations. Capacitor 378 and resistor 376 are part of the bias network for both transistors 356 and 382. Resistors 388, 390 and 392, and capacitors 394, 396 and 398 are the RC decoupling network from the +8.0 volt input. Components 400 and 402 are the pulse shapers to the input of the first half of dual transistor 404. Resistors 402 and 405 prove bias to the first cover. Resistor 406 is a collective resistor for this transistor. Resistor 408 is the emitter bias resistor for all of transistor 404, while resistors 410, 412, and 414 supply bias to the second half of the base of 404. Resistor 414 is the collector output resistor of transistor 416. Capacitor 418 is the feedback coupler from transistor 416 to the second half of the base of transistor 404. Capacitor 420 is the AC path to the bias of the second half of transistor 404. Capacitor 422 is part of the input pulse shaping network to the ×10 amplifier. Capacitor 424 is the input coupling to the base of the first half of dual transistor 426. Resistors 428 and 430 provide base bias to the first half of of 426. Resistor 432 is the common emitter resistor of transistor 426. Resistor 434 is the collector resistor for the first half of transistor 426. This transistor 426 is the key component of the ×10 voltage amplifier. Resistors 436, 438, 440 and 442 provide bias to the second half of transistor 426. Resistor 440 is also part of the feedback loop from transistor 444 to the second half of 426. Resistor 447 is the collector resistor of transistor 444. Capacitor 448 is the AC path to the bias of the second half of 426.

Figure 15:
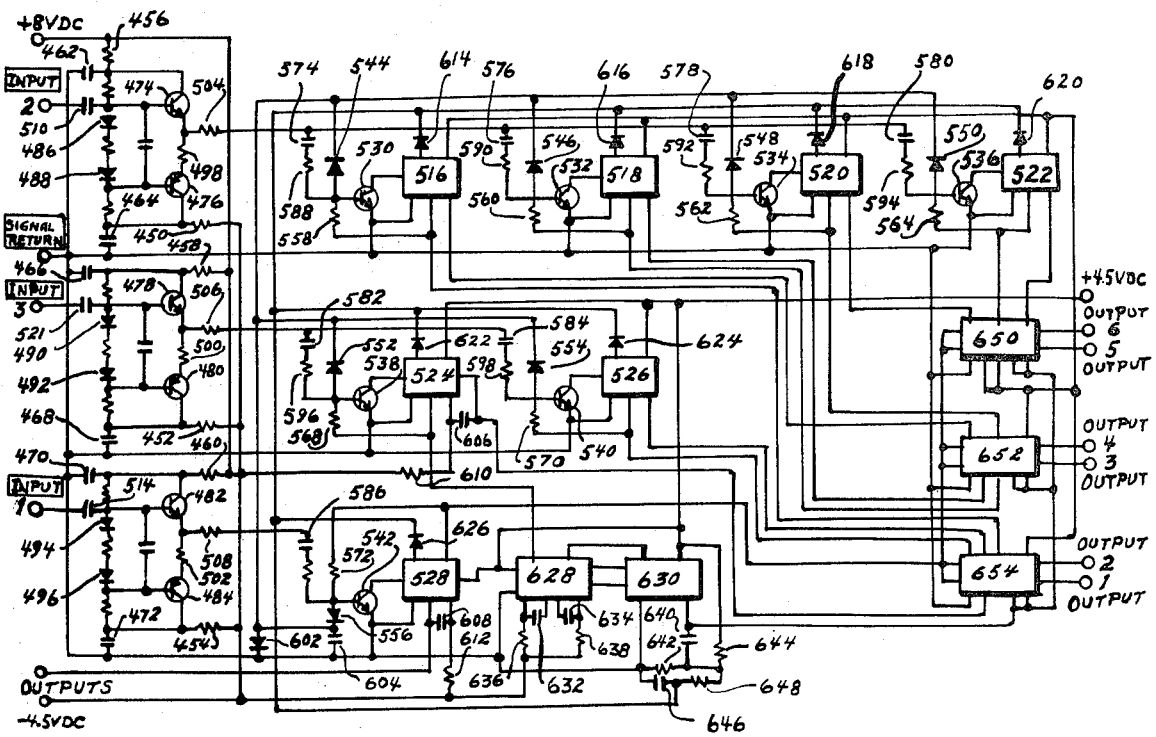
FIG. 15 is a circuit diagram of the LET detector system signal analyzer.

The schematic representations of the buffer amplifier are shown on the left of FIG. 15. The buffers are powered by the −4.5 and +8.0 volt DC sources from the LET power supply. Resistors 450, 452 and 454 operate from the power supply at −4.5 volts while resistors 456, 458 and 460 are activated from the power supply +8.0 volts. Capacitors 462 through 472 are the remainder of the required RC decoupling network for the buffers. The main components for the buffer amplifiers are transistors 474, 476, 478, 480, 482 and 484. These are readily available as 2N4121 and 2N2484 transistors. Also diodes 486 through 496 are part of the biasing network but additionally provide temperature compensation to the buffer amplifiers. Resistors 498, 500 and 502 are the output separators between the transistor pairs 474–476, 478–480, and 482–484, respectively, in each buffer. Resistors 504, 506, and 508 provide short circuit protection for the buffers at the output, while capacitors 510, 512 and 514 are input isolation and pulse shaping to the buffers from the preamplifiers of FIG. 14.

In the LET analyzers, the boxes 516 through 528 are integrated circuits and perform the function of electrical flip-flop circuits. Transistors 530 to 542 provide the drive to the flip-flops. Diodes 544 to 556 are 0.5 milliampere tunnel diode triggers. The tunnel diodes deliver the discrimination for the integrated flip-flops. Resistors 558 through 572 deliver the necessary current from the input buffers herein described to trigger the 0.5 milliampere tunnel diodes. Capacitors 574 to 586 in combination with resistors 588 to 600 form the RC pulse shaping network to trigger the tunnel diodes. Diode 602 delivers the 0.3 volt bias above ground for the tunnel diodes 544 to 556. Capacitor 604 in combination with diode 602 are the AC ground path from the cathodes of the said tunnel diodes. Capacitors 606 and 608 in conjunction with resistors 610 and 612 form the initial one-shot trigger pulse to reset channels one to seven and the other channels back to zero once turn-on is accomplished. Diodes 614 to 626 are the isolation between the integrated flip-flops 516 to 528 and the delayed strobe to be discussed hereinafter. These diodes are used to reset all flip-flops to initial conditions after the duration of the timing stroke pulse of 10 microseconds.

Integrated circuits 628 and 630 comprise the delayed strobe shown in FIG. 13. Circuit 630 generates pulse inversion for the delayed strobe while circuit 628 is a double "one-shot" flip-flop. The first "one-shot" has a 3 microsecond delay. Ten microseconds is the analyzing time following the triggering of each channel. Capacitors 632 and 634 in conjunction with resistors 636 and 638 provide the two RC time constants to drive the one-shots. The 10 microsecond pulse from the delayed strobe is the output to the analyzer gates. Capacitor 640, resistors 642 and 644 differentiate and integrate the 10 microsecond pulse of the strobe. The negative going part of the differentiated integrated pulse then resets the analyzers 516 to 528. Further, the delayed strobe serves to keep the analysis of the pulses from the detectors and amplifiers from happening too fast. It does this by allowing the pulses to reach their peak amplitude before analysis is conducted. Components 646 and 648 are the decoupling from the delayed strobe to the pulse height analyzer. Signals from the pulse height analyzers are fed to the AND gates 650, 652 and 654. The gates may be dual, four input gates and are the controlling logic circuits before the signals reach the counters as explained with regard to FIG. 13.

Figure 16:
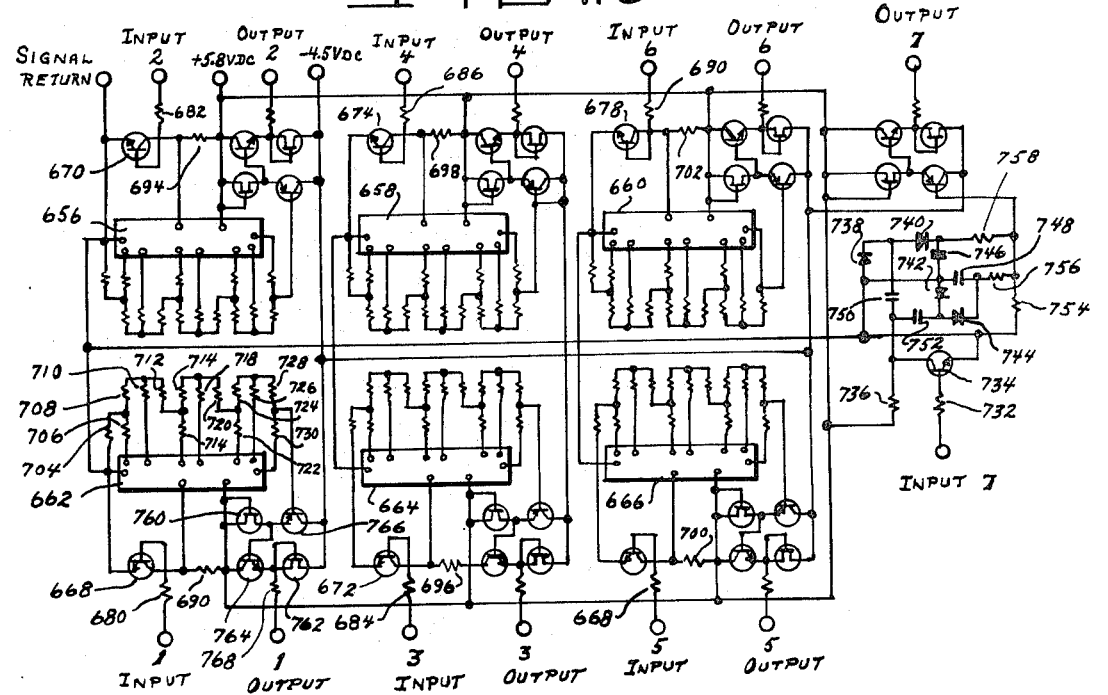
FIG. 16 is a circuit diagram of the LET detector system counter and output subsystems.

FIG. 16 shows the detailed circuit schematic diagram of the seven bit stair-step counters. The six counters are metal oxide silicon field effect tranSistors 656, 658, 660, 662, 664, 666 and are arranged in ladder adder "2R"WR" networks. These counters are output for the six energy analyzer channels of LET detector 280 in FIG. 13. Transistors 668 to 678 provide the necessary pulse amplitude to trigger the field effect counters. Resistors 680, 682, 684, 688 and 690 provide the current required to trigger transistors 668 to 678. Resistors 692, 694, 696, 698, 700 and 702 are the bias resistors for transistors 668 to 678. The output of each of the six counters appears as a linear count ramp with voltage limited to 0.0 to 5.0 volts DC. The corresponding counts run 0.0 to 128.0 counts. For example, each time a proton of random energy, say 15 Mev, strikes the first detector, it registers a count on counter 666. The counters are designed so that the ramp level is reset back to 0.0 volts and 0.0 counts when the 5.0 volt or 128.0 count level is reached in each channel. The slope of the ramp for any output is a function of the "R-2R" ladder network. One such "R-2R ladder consists of resistors 704 through 730 shown with regard to counter 662. The remaining counters utilize similar ladder networks. The "R-2R" ladders join the seven state counters to the telemetry buffer.

The rate meter for the LET system in FIG. 16 is the output of the anticoincidence detector 282. It functions to transfer electrical counts received into a steady 0.0 to 5.0 volt DC level. It is the only nonlinear ramp type output the LET system utilizes. The rate meter is a semilogarithmic device that is so arranged that 0.0 to 4,000 counts per minute are compressed into an 0.0 to 5.0 volt DC scale. Resistor 732 provides input current to driver transistor 734 of the rate meter. Resistor 736 is the collector resistor for the tranSistor 734. Diodes 738, 740, 742 and 744 are the diode pumps of the rate meter. Capacitors 746 and 748 are the voltage holding capacitors for the rate meter, while capacitors 750 and 752 are utilized to increase linearity in the rate meter. Resistors 754, 756 and 758 are the summing network for the output of the rate meter. The output of the rate meter is an 0.0 to 5.0 volt analog output.

The telemetry buffer amplifier systems for the seven LET channels are shown as connected to the outpus one through seven in FIG. 16. For the purpose of clarity only one of the buffers will be analyzed since all buffers are identical. Considering the channel one system, field effect transistors 760 and 762 are the constant current source for transistors 764 and 766. These four components act as a power driver for the counters e.g., 662. The telemetry buffers prevent any loading of the outputs of the LET system. Resistor 768 is a protective device to eliminate any short circuit damage to the outputs of the LET system.

Figure 17:
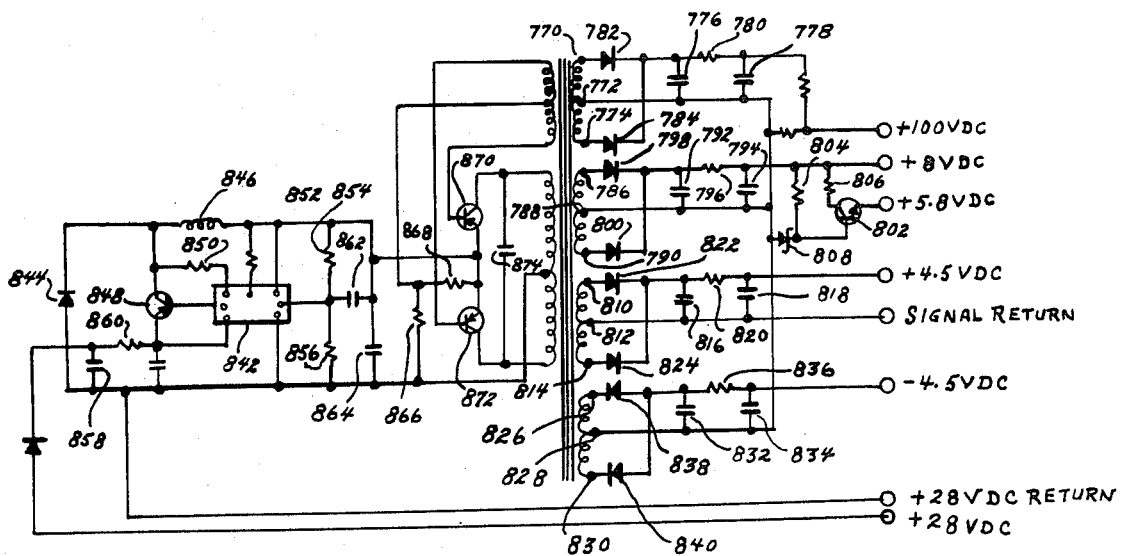
FIG. 17 is a circuit diagram of the LET detector system power supply.

FIG. 17 discloses the LET power supply system. The power supply system supplies voltage to operate all other electronic subsystems hereinbefore described. The system shown is constructed to operate from a DC input of 28 +4 or −8 volts of unregulated power. Secondary transformer windings 770, 772 and 774 are the high voltage windings supplying 150 volts of positive DC level to the entrance and anticoincidence detector. Capacitors 776 and 778 and resistor 780 are the filters for the high voltage from 150 to 100 volts. Diodes 782 and 784 act as a fullwave bridge rectifier for the circuit. Transformer secondary windings 786, 788 and 790 are the +8.0 volt output that drives the charge, shaper and voltage amplifiers. Further, the trimmed and regulated −5.8 volts drives the rate meter, the metal oxide silicon field effect transistor counters and telemetry buffers. Capacitors 792 and 794 and resistor 796 are the filter network for the +8.0 volt winding. Diodes 798 and 800 are the rectifiers for this part of the power supply output.

A small voltage regulator circuit consisting of transistor 802, resistors 804 and 806 and diode 808 provide the +5.8 volts to run the counters and the positive voltage on the telemetry buffers.

Transformer secondary windings 810, 812 and 814 are the +4.5 volt DC output to drive the logic circuitry. Capacitors 816, 818 and resistor 820 are the filter network for this voltage source. Diodes 822 and 824 function as rectifiers as they did on the other secondary voltages. Transformer secondary windings 826, 828 and 830 function as voltage driver for the pulse height analyzers, buffer amplifiers, telemetry buffers, and the one-shot circuits in the analyzer and delayed strobe. Capacitors 832 and 834 and resistor 836 are the filters for the −8.0 volt source. Diodes 838 and 840 are the rectifiers for this source.

The power supply regular 842 is an integrated circuit, its function with the switching regulator is to provide constant output voltages at the secondary transformer windings when changes occur in output lead or input voltage. Diode 844 provides the voltage return for coil 846. Transistor 848 driven by the regulator 842 is the switch that regulates the power supply voltage. Resistors 850, 852, 854 and 856 are sensing resistors to operate the regulator 842. Capacitor 858 is an input filter to the power supply. Resistor 860 is the input short circuit regulation protection which limits the current to the power supply to approximately 0.5 ampere. Capacitor 862 is part of the regulator operational network, and 864 is a filter capacitor. Resistors 866 and 868 are the drivers for the switching transistors 870 and 872. The switchers drive the transformer up or down depending on the load drawn at the secondaries to the transformer or the swing in input voltage to the power supply. Capacitor 874 across the collectors of 870 and 872 prevents excessive voltage spiking.

Having thus described our invention for an advanced dosimetry system, the following claims are presented.

We claim:

1. A dosimetry system for measuring instantaneous dose and linear energy transfer spectrum of space radiations comprising: a base; a housing mounted on the base; a tissue equivalent ionization chamber detachably mounted in the housing; a spring biased electrical conductor connecting the said ionization chamber to the housing; electronic means for operating the tissue equivalent ionization chamber mounted in the housing; a linear energy transfer detector spectrometer mounted in the base; said detector spectrometer further comprising, first and second solid state energy detectors, first and second electronic channels for analyzing the signals generated in each of said detectors, and means for communicating the measured information.

2. A dosimetry measuring system according to claim 1 wherein the said first and second electronic channels comprise: means for shaping the signals from the detectors; means for discriminating between the shaped signals connected to the shaping means; logic means; counter means associated with the logic means wherein only signals with a selected pulse height are counted.

* * * * *